US010221672B2

(12) United States Patent
Alturbeh et al.

(10) Patent No.: US 10,221,672 B2
(45) Date of Patent: Mar. 5, 2019

(54) ROTARY STEERABLE ROLL STABILIZED CONTROL SYSTEM

(71) Applicant: Schlumberger Technology Corporation, Sugar Land, TX (US)

(72) Inventors: Hamid Alturbeh, Huddersfield (GB); James Ferris Whidborne, Cranfield (GB); Martin Thomas Bayliss, Stroud (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 191 days.

(21) Appl. No.: 15/246,769

(22) Filed: Aug. 25, 2016

(65) Prior Publication Data

US 2017/0067332 A1    Mar. 9, 2017

Related U.S. Application Data

(60) Provisional application No. 62/213,725, filed on Sep. 3, 2015.

(51) Int. Cl.

| | |
|---|---|
| *E21B 44/00* | (2006.01) |
| *E21B 7/06* | (2006.01) |
| *H02P 27/08* | (2006.01) |
| *H02P 6/16* | (2016.01) |
| *H02P 23/14* | (2006.01) |

(52) U.S. Cl.
CPC ............ *E21B 44/005* (2013.01); *E21B 7/068* (2013.01); *H02P 6/16* (2013.01); *H02P 23/14* (2013.01); *H02P 27/08* (2013.01)

(58) Field of Classification Search
CPC ........ E21B 44/005; E21B 7/067; E21B 7/068; E21B 4/04
See application file for complete search history.

(56) References Cited

U.S. PATENT DOCUMENTS

| | | | | |
|---|---|---|---|---|
| 5,695,015 | A * | 12/1997 | Barr ......................... | E21B 7/04 |
| | | | | 175/45 |
| 2011/0100623 | A1* | 5/2011 | Bebb ....................... | E21B 41/00 |
| | | | | 166/250.01 |
| 2016/0230538 | A1* | 8/2016 | Zacharko ................ | E21B 7/062 |

OTHER PUBLICATIONS

DC-Bus Voltage Control of Three-Phase AC/DC PWM Converters Using Feedback Linearization (Year: 2000).*

(Continued)

*Primary Examiner* — Brad Harcourt
*Assistant Examiner* — David Carroll

(57) ABSTRACT

A rotary controlled system includes first and second alternators electrically connected to one another via a DC voltage bus. The alternators may optionally be further mechanically connected to one another via corresponding rotationally coupled components (such as rotationally coupled stators). A first field oriented controller is electrically connected with the first alternator and configured to cause the first alternator to provide a constant DC voltage to the voltage bus. A second field oriented controller is electrically connected with the second alternator and configured to receive electrical power from the voltage bus and cause the second alternator to provide servo angular position control of the rotationally coupled components. The system may be employed in a downhole rotary steerable tool to provide servo angular position control of a roll stabilized housing.

18 Claims, 7 Drawing Sheets

(56) References Cited

OTHER PUBLICATIONS

Hughes et al., Electric Motors and Drives. Newnes, 4th ed., Chapter 9, pp. 281-313. 2013, Elsevier Ltd., Oxford, UK.
Lee et al., DC-bus voltage control of three-phase AC/DC PWM converters using feedback linearisation. 2012. IEEE Transactions on Industry Applications, 36(3).
Panchal et al., Attitude control system for directional drilling bottom hole assemblies. IET Proceedings Control Theory and Applications, 6(7), 884-892. doi:10.1049/iet-cta.2011.0438.

\* cited by examiner

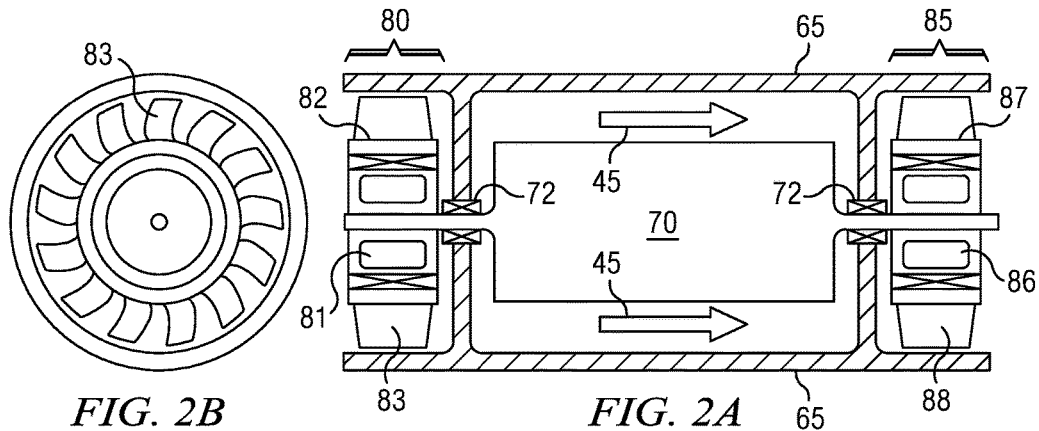
FIG. 2B  FIG. 2A
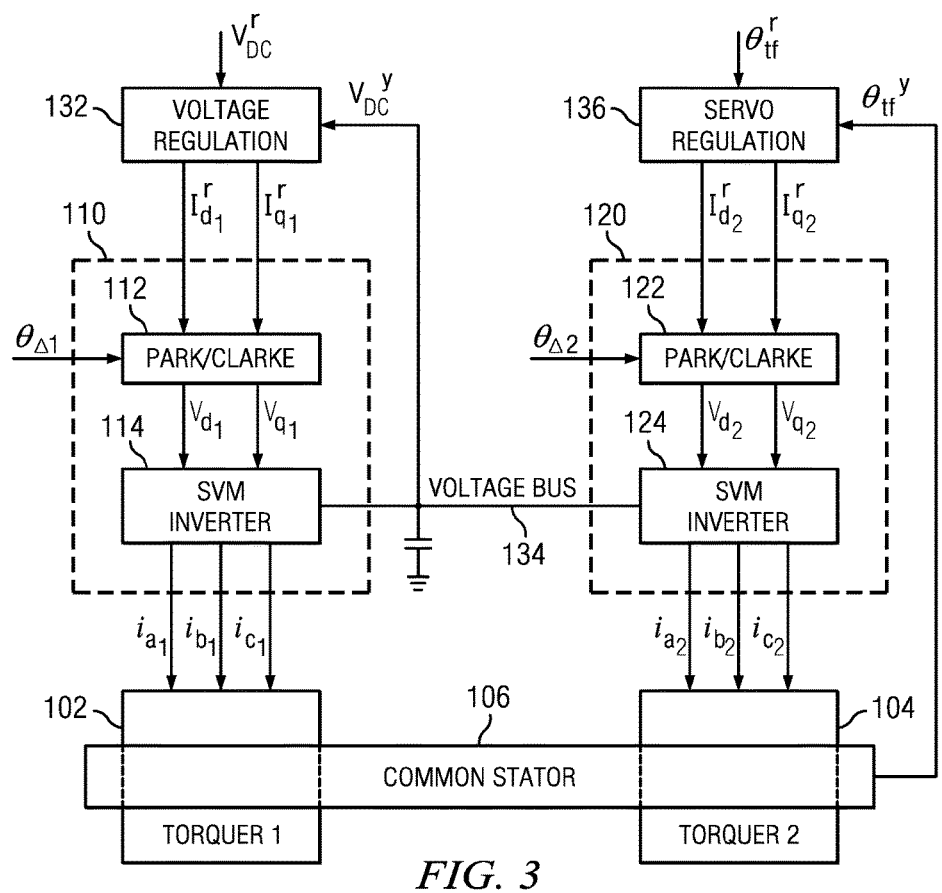
FIG. 3

ROTARY STEERABLE ROLL STABILIZED CONTROL SYSTEM

CROSS REFERENCE TO RELATED APPLICATIONS

This application claims the benefit of: U.S. Provisional Application Ser. No. 62/213,725 filed Sep. 3, 2015 and entitled Rotary Steerable Roll Stabilized Control System.

BACKGROUND

Rotary steerable drilling tools are commonly utilized in downhole drilling operations. The use of such drilling tools tends to confer several advantages, for example, including improved well placement with reduced wellbore tortuosity and a smoother, less aggressive borehole wall. Moreover, rotary steerable tools tend to provide better weight transfer to the bit and improved wellbore cleaning, which in turn tends to increase the rate of penetration of drilling.

The use of drilling automation with rotary steerable drilling tools is also becoming increasingly common in drilling subterranean wellbores. Such methods may be employed, for example, to control the direction of drilling based on various downhole feedback measurements or to control various aspects of tool functionality.

SUMMARY

A rotary controlled system includes first and second alternators electrically connected to one another via a DC voltage bus. The alternators may optionally be further mechanically connected to one another via corresponding rotationally coupled components (such as rotationally coupled stators). A first field oriented controller is electrically connected with the first alternator and configured to cause the first alternator to provide a constant DC voltage to the voltage bus. A second field oriented controller is electrically connected with the second alternator and configured to receive electrical power from the voltage bus and cause the second alternator to provide servo angular position control of the rotationally coupled components.

In one example embodiment, a downhole tool includes a downhole tool collar configured for coupling with a drill string such that the tool collar rotates with the drill string. A roll stabilized housing is deployed in and rotationally decoupled from the tool collar. An electronic controller deployed in the roll stabilized housing includes first and second field oriented controllers, the first field oriented controller configured to provide a constant DC voltage to a voltage bus and the second field oriented controller configured to receive power from the voltage bus and provide servo angular position control for the roll stabilized housing.

In another example embodiment, a method for controlling a downhole tool includes (i) pumping drilling fluid through the downhole tool while rotating the tool in a subterranean wellbore, the tool including first and second turbine alternators electrically connected to one another via a voltage bus and mechanically connected to one another via rotationally coupled component; (ii) causing a first field oriented controller to regulate power output from the first turbine alternator to provide a constant DC voltage at the voltage bus; and (iii) causing a second field oriented controller to receive electrical power from the voltage bus and to regulate the second turbine alternator to provide servo angular position control of the rotationally coupled components.

The disclosed embodiments may provide various technical advantages. For example, certain of the disclosed embodiments may provide for fast and efficient servo and motor control. Moreover, the disclosed embodiments tend to be robust and allow for thorough validation and verification testing. In rotary steerable embodiments, the disclosed embodiments may provide for improved angular position control of a roll stabilized housing which may in turn improve tool performance metrics such as steerability and rate of penetration of drilling. The disclosed embodiments may further provide for improved position control at higher drilling speeds and tend to reduce electric power conversion within the tool.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 2A and 2B (collectively FIG. 2) depict a schematic representation of one embodiment of a roll stabilized housing deployed in a rotary steerable tool.

FIG. 3 depicts one example of a general control flow diagram.

DETAILED DESCRIPTION

At least some disclosed embodiments relate generally to angular position control in rotary systems and more particularly to a rotary steerable system employing field oriented control applied to cascaded voltage regulation and servo angular position control using an open loop plant model of a roll-stabilized housing.

Figure 1:
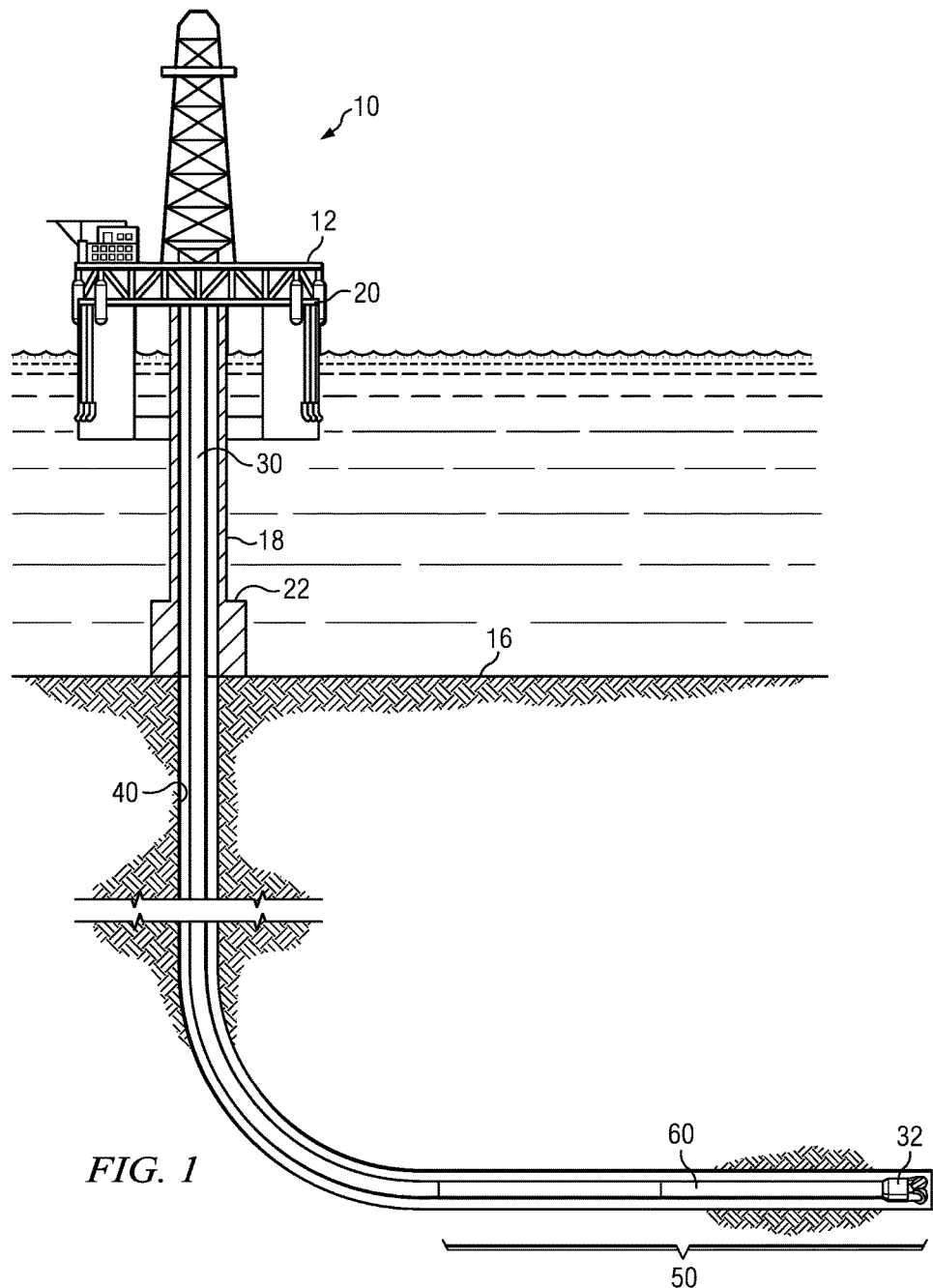
FIG. 1 depicts an example drilling rig on which disclosed embodiments may be utilized.

FIG. 1 depicts a drilling rig 10 suitable for using various method and system embodiments disclosed herein. A semi-submersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus (not shown) for raising and lowering a drill string 30, which, as shown, extends into borehole 40 and includes a bottom hole assembly (BHA) 50. In the depicted embodiment, the BHA 50 includes a drill bit 32 and a rotary steerable tool 60 (also sometimes referred to as a directional drilling tool). Those of ordinary skill in the art will readily appreciate that, while not depicted, rotary steerable tools commonly include navigation sensors such as triaxial accelerometers, triaxial magnetometers, and gyroscopic sensors. The BHA 50 may further include substantially any other suitable downhole tools such as a downhole drilling motor, a downhole telemetry system, a measurement while drilling tool, a logging while drilling tool, and the like. The disclosed embodiments are not limited in regards to such other tools.

The rotary steerable tool may include substantially any suitable steering tool including a roll stabilized controller (or control unit) deployed in a roll stabilized housing or an otherwise substantially non-rotating housing. For example, various PowerDrive (trademark of Schlumberger) rotary steerable systems include a drill collar that is intended to fully rotate with the drill string and an internal roll-stabilized control unit intended to remain substantially rotationally geostationary (i.e., rotationally stable with respect to the tool axis, the tool axis attitude being defined with respect to the wellbore reference frame). Other rotary steerable systems, e.g., including the PathMaker rotary steerable system (a trademark of Schlumberger), the AutoTrak® rotary steerable system (available from Baker Hughes), and the GeoPilot rotary steerable system (a trademark of Halliburton) include a substantially non-rotating outer housing employing blades that engage the borehole wall.

While various embodiments are described herein with respect to rotary steerable drilling tools, it will be understood that the disclosed embodiments are not so limited. Rather, disclosed control system embodiments may be suitably employed to provide rotational control for substantially any suitable downhole tools in which one portion of the tool rotates relative to another (e.g., including a geo-stationary sensor housing that is free to rotate with respect to the drill string). Moreover, the disclosed embodiments are not even limited to downhole tools. The disclosed embodiments include a rotary control system including first and second alternators electrically coupled to one another via a common DC voltage bus. The alternators may optionally be further mechanically/rotationally coupled to one another, for example, via mechanically/rotationally coupled rotor or stator components.

FIGS. 2A and 2B (collectively FIG. 2) depict a schematic representation of one embodiment of a roll stabilized housing 70 deployed in rotary steerable tool 60 (FIG. 1). The roll stabilized housing 70 is mounted on bearings 72 such that it is rotationally decoupled from (able to rotate independently with respect to) tool collar 65. First and second alternators 80, 85 (e.g., of the permanent magnet synchronous motor type) are separately mounted on opposing axial ends of the roll stabilized housing 70. The corresponding stator windings 81, 86 are mechanically continuous with the roll stabilized housing 70 (and are therefore rotationally coupled with the roll stabilized housing). Corresponding rotors including permanent magnets 82, 87 are configured to rotate independently of both the roll stabilized housing 70 and the tool collar 65. Impeller blades 83, 88 are mechanically contiguous with the corresponding rotors and span the annular clearance between the housing 70 and the tool collar 65 such that they rotate, for example, in opposite directions with the flow of drilling fluid 45 through the tool.

In the embodiment depicted on FIG. 2, the housing 70 receives electrical power from circulating drilling fluid 45 that rotates the impellers in alternators 80, 85. Moreover, in certain embodiments the roll stabilized housing 70 is intended to be rotationally stationary with respect to an external environment (e.g., rotationally geostationary with respect the wellbore). Such geostationary positioning often requires precise servo angular position control of the housing 70 while the drill collar 65 rotates in the wellbore. Based on the foregoing it will be appreciated that there may be at least two control objectives coupled through the roll stabilized housing 70, namely those of power/voltage regulation and geostationary servo control. Hence, the housing 70 may be thought of as including an electromechanical plant having two control inputs (the duty cycles of each alternator stator winding) and two control outputs (a regulated voltage source and a roll stabilized geostationary position).

While not depicted on FIG. 2, it will be understood that each alternator 80, 85 may further include a position sensor, such as a resolver, an encoder, or other passive position sensor, for measuring the relative angular position and/or the relative rotational speed between the rotor and stator (i.e., between the impellers and the stator). Estimation techniques, such as Kalman filtering, may alternatively and/or additionally be used obtain the relative positional and rotation speed.

FIG. 3 depicts one example of a general control flow diagram intended to satisfy the two control objectives described above with respect to FIG. 2. FIG. 3 depicts first and second torquers 102, 104 (e.g., turbine alternators 80 and 85 shown on FIG. 2) deployed about a common stator 106 (e.g., including housing 70). The depicted embodiment includes first and second field oriented controllers (FOC) 110, 120 electrically coupled to one another via voltage bus 134 and mechanically coupled to one another via the common stator 106.

It will be understood that the phrase "common stator" is meant to disclose that the stator windings 81, 86 are rotationally coupled to one another such that they rotate together about the tool axis. Stated another way the stator windings 81, 86 share a common rotation, for example, via the roll stabilized housing 70 in FIG. 2. The term "common stator" is not intended to imply a common electromagnetic coupling (e.g., via common stator windings).

With continued reference to FIG. 3, a voltage regulation block 132 receives a DC voltage demand $V_{DC}{}^r$ and a measured voltage feedback $V_{DC}{}^y$ from the voltage bus 134 and outputs direct and quadrature demand currents $I_{d1}{}^r$ and $I_{q1}{}^y$ to FOC controller 110. A Clarke-Park transform routine is used to process a relative rotational position ($\theta_{\Delta 1} = \theta_{r1} - \theta_{s1}$) between the rotor and stator in the first torquer to transform the direct and quadrature demand currents to direct and quadrature voltages $V_{d1}$ and $V_{q1}$ at 112. These voltages are then further transformed to three-phase sinusoidal currents $i_{a1}$, $i_{b1}$, and $i_{c1}$ at 114 via a space vector modulator (SVM) inverter. The three-phase sinusoidal currents may be applied to the first torquer 102 as depicted in order to maintain a constant voltage supply on the voltage bus 134.

A servo regulation block (or angular position regulation block) 136 receives a demand angular position (e.g., toolface) $\theta_{tf}{}^r$ and a measured angular position feedback $\theta_{tf}{}^y$ from the common stator 106 (e.g., from accelerometers and/or magnetometers deployed in the roll stabilized housing 70) and outputs direct and quadrature demand currents $I_{d2}{}^r$ and $I_{q2}{}^r$ to FOC controller 120. A Clarke-Park transform routine is used to process a relative toolface rotational position ($\theta_{\Delta 2}=\theta_{r2}-\theta_{s2}$) between the rotor and stator in the second torquer to transform the direct and quadrature demand currents to direct and quadrature voltages $V_{d2}$ and $V_{q2}$ at 122. These voltages are then further transformed to three-phase sinusoidal currents $i_{a2}$, $i_{b2}$, and $i_{c2}$ at 124 via an SVM inverter. The three-phase sinusoidal currents may then applied to the second torquer 104 as depicted in order to provide servo angular position control of the stator 106 (i.e., to maintain the stator at a constant toolface angle).

With continued reference to FIGS. 2 and 3, an electromechanical plant model of the disclosed system is now presented. Direct and quadrature voltage components $u_d$ and $u_q$ in a direct quadrature dq reference frame may be expressed mathematically, for example, as follows:

$$u_d = R_s I_d + \frac{d\varphi_d}{dt} - (\omega_r - \omega_s)\varphi_q \qquad (1)$$

$$u_q = R_s I_q + \frac{d\varphi_d}{dt} + (\omega_r - \omega_s)\varphi_d$$

where $I_d$ and $I_q$ represent direct and quadrature current components, $R_s$ represents a stator winding resistance, $\omega_r$ and $\omega_s$ represent rotational speeds of the rotor and stator such that $\omega_r-\omega_s$ represents the rotation speed of the dq reference frame, $\varphi_d$ and $\varphi_q$ represent direct and quadrature axis flux linkage components such that $\varphi_d=L_d I_d+\varphi_m$ and $\varphi_q=L_q I_q$. The parameters $L_d$ and $L_q$ represents the inductances of the direct and quadrature axes of the state are and $\varphi_m$ represents a constant magnetic flux produced by the permanent magnets 82, 87.

The electromagnetic torque $T_e$ may be expressed mathematically, for example, as follows:

$$T_e = \frac{3}{2} P[\varphi_m I_q + (L_d - L_q) I_d I_q] \qquad (2)$$

where P represents the number of pole pairs. A mechanical governing equation may be expressed mathematically, for example, as follows:

$$J\frac{d\omega}{dt} = T_e - b\omega - T_m \qquad (3)$$

where J represents an inertia, b represents a fraction coefficients, and $T_m$ represents a load torque. Based on the foregoing, a mathematical model for the roll stabilized housing 70 may be expressed, for example, as follows:

$$i_{d1} = \frac{1}{L_d}[u_{d1} - R_s I_{d1} + (\omega_{r1} - \omega_s)L_q I_{q1}] \qquad (4)$$

$$i_{d2} = \frac{1}{L_d}[u_{d2} - R_s I_{d2} + (\omega_{r2} - \omega_s)L_q I_{q2}]$$

$$i_{q1} = \frac{1}{L_q}[u_{q1} - R_s I_{q1} - (\omega_{r1} - \omega_s)(L_d I_{d1} + \varphi_m)]$$

$$i_{q2} = \frac{1}{L_q}[u_{q2} - R_s I_{q2} - (\omega_{r2} - \omega_s)(L_d I_{d2} + \varphi_m)]$$

-continued $$\dot{\omega}_{r1} = \frac{1}{J_{r1}}\left[\frac{3P}{2}\varphi_m I_{q1} - T_{m1} - b\omega_{r1}\right]$$

$$\dot{\omega}_{r2} = \frac{1}{J_{r2}}\left[\frac{3P}{2}\varphi_m I_{q2} - T_{m2} - b\omega_{r2}\right]$$

$$\dot{\omega}_s = \frac{1}{J_s}\left[\frac{3P}{2}\varphi_m I_{q1} + \frac{3P}{2}\varphi_m I_{q2} + b_s\omega_s\right]$$

$$\dot{\theta}_s = \omega_s$$

Where the subscripts (1 and 2) refer to the first and second torquers, the subscripts (r and s) refer to rotor (outer) and stator (inner) parts of the torquers, and the dot accent on the left-hand side of each equation denotes the first derivative of the corresponding quantity with respect to time (e.g., such that $i_{d1}=dI_{d1}/dt$, $i_{q1}=dI_{q1}/dt$, and so on).

Figure 4:
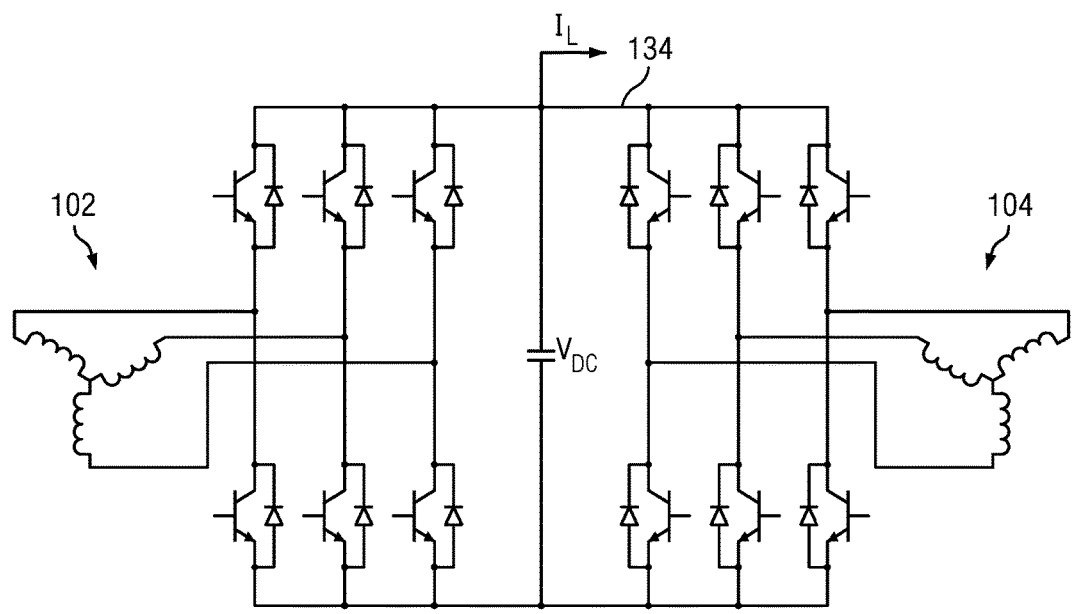
FIG. 4 depicts a drive architecture of the embodiment shown on FIGS. 2 and 3.

FIG. 4 depicts a drive architecture of the embodiment shown on FIGS. 2 and 3. The control topology is configured such that the first torquer 102 is controlled (by FOC controller 110) to provide a constant voltage to the voltage bus 134 and therefore to provide voltage regulation of the voltage used by the motor control of the second torquer 104. While not depicted, it will be appreciated that the voltage bus 134 may optionally further include or be coupled to a chopper leg to assist in voltage regulation. The second torquer applies the servo angular position control to the common stator 106 (the roll stabilized housing 70) such that it maintains the stator at a constant toolface angle, thereby balancing the disturbance torques both from the mod impeller torque reactions and the electromagnetically induced torque balance between the two torquers. These two control functions (and therefore controllers 110 and 120) may be uncoupled using bandwidth separation such that the speed of the voltage regulation is sufficiently fast in comparison to the servo control loop.

The applied voltage regulation scheme makes use of feedback linearization to provide a wider operating envelope than would otherwise be possible with a small perturbation-based linearization control scheme. As used herein the term feedback linearization refers to a technique in which an inner loop linearizes the input-state relationship and an outer loop stabilizes the closed-loop dynamics. In this scheme the first torquer 102 is understood to be rectifying the power taken from the drilling fluid as if it were a three-phase supply as shown on FIG. 4.

Figure 5:
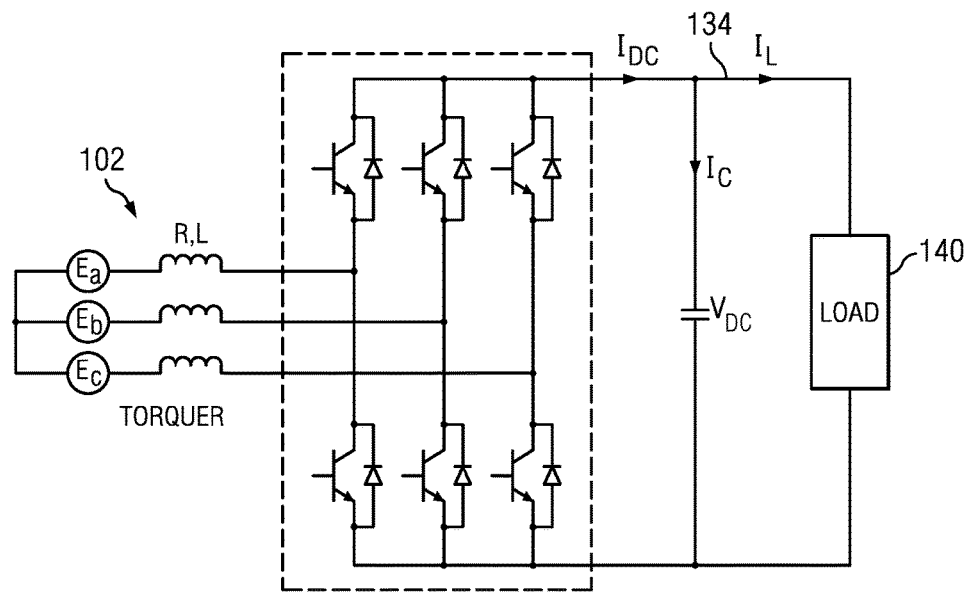
FIG. 5 depicts a voltage regulation schematic for the embodiment shown on FIGS. 2 and 3.

FIG. 5 depicts a voltage regulation schematic in which the first torquer 102 functions as a three-phase power supply providing a constant voltage to load 140 (e.g., voltage bus 134 which in turn powers the second torquer 104). The non-linear governing equations representing the depicted voltage regulator may be expressed, for example, as follows:

$$\dot{x}=f(x)+gu$$

$$y=h(x) \qquad (5)$$

where $\dot{x}=[\dot{I}_d, \dot{I}_q, \dot{V}_{DC}]^T$, $y=[I_d, V_{DC}]^T$, $u=[u_d-0, u_q-E_q]^T$, and:

$$f(x) = \begin{bmatrix} -\frac{R_s I_d}{L} + \omega I_q \\ -\frac{R_s I_q}{L} - \omega I_d \\ \frac{3}{2CV_{DC}}E_q I_q - \frac{I_L}{C} \end{bmatrix}, \text{ and } g = \begin{bmatrix} \frac{1}{L} & 0 \\ 0 & \frac{1}{L} \\ 0 & 0 \end{bmatrix}$$

where $L=L_d=L_q$, $d\omega/dt=0$, and $E_q$ represents the q-phase voltage source. The control objectives are to regulate $I_d$ to zero and $V_{DC}$ to the required voltage DC-bus value using the FOC SVM voltage control inputs $u_d$ and $u_q$. Differentiating the controlled outputs $y_1=I_d$ and $y_2=V_{DC}$ until the inputs appear and rearranging gives:

$$\begin{bmatrix} \ddot{y}_1 \\ \ddot{y}_2 \end{bmatrix} = A(x) + E(x)\begin{bmatrix} u_1 \\ u_2 \end{bmatrix} \text{ where} \quad (6)$$

$$A(x) = \begin{bmatrix} f_1 \\ \dfrac{3}{2CV_{DC}}E_q f_2 - \dfrac{3f_3}{2CV_{DC}^2}E_q I_q - \dfrac{I_L}{C} \end{bmatrix},$$

$$E(x) = \begin{bmatrix} \dfrac{1}{L} & 0 \\ 0 & \dfrac{0}{2CV_{DC}L} \end{bmatrix}$$

$$f_1 = -\dfrac{R_s I_d}{L} + \omega I_q, \quad f_2 = -\dfrac{R_s I_q}{L} - \omega I_d,$$

$$f_3 = \dfrac{3}{2CV_{DC}}E_q I_q - \dfrac{I_L}{C}$$

Therefore the control gains $u_1$ and $u_2$ can be evaluated, for example, as follows:

$$\begin{bmatrix} u_1 \\ u_2 \end{bmatrix} = E^{-1}(x)\left[-A(x) + \begin{bmatrix} v_1 \\ v_2 \end{bmatrix}\right] \text{ where:} \quad (7)$$

$$\begin{bmatrix} v_1 \\ v_2 \end{bmatrix} = \begin{bmatrix} \dot{y}_{1ref} - k_{11}e_1 - k_{12}\int e_1 dt \\ \ddot{y}_{2ref} - k_{21}\dot{e}_2 - k_{22}e_2 - k_{23}\int e_2 dt \end{bmatrix}$$

assuming the following error dynamics:

$$\ddot{e}_1 + k_{11}\dot{e}_1 + k_{22}e_1 = 0$$

$$\dddot{e}_2 + k_{21}\ddot{e}_2 + k_{22}\dot{e}_2 + k_{23}e_2 = 0$$

Figure 6:
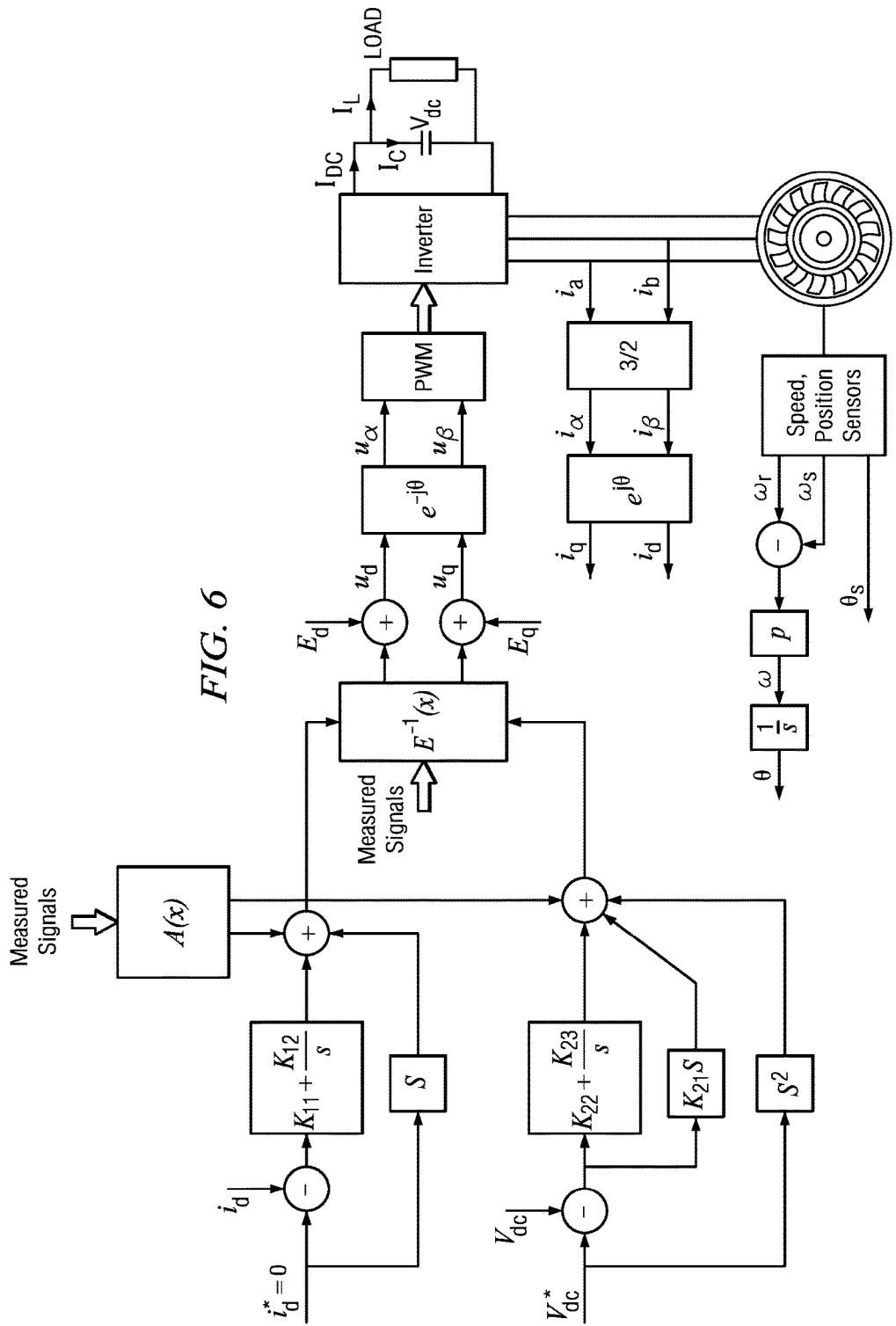
FIG. 6 depicts a schematic of one implementation of a feedback linearization controller generating $u_d$ and $u_q$ FOC SVM inputs.

FIG. 6 depicts a schematic of one implementation of the above described feedback linearization controller generating the $u_d$ and $u_q$ FOC SVM inputs.

Figure 7:
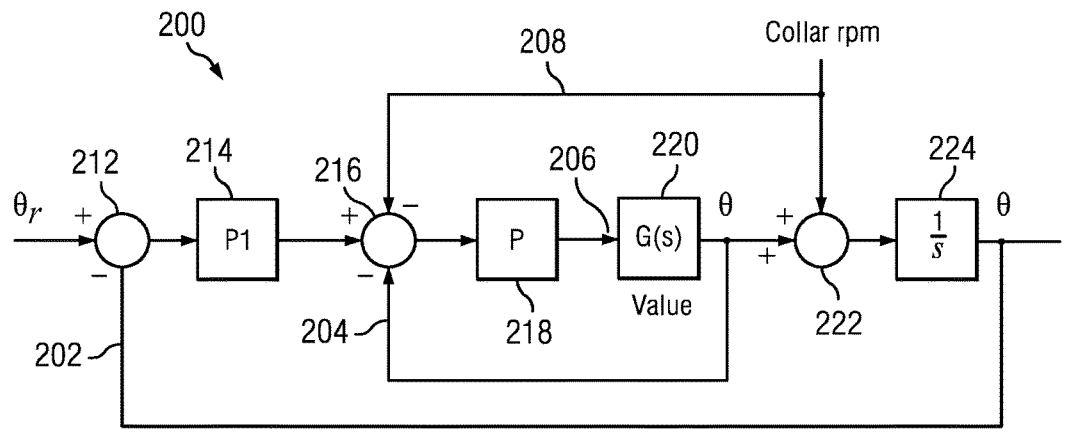
FIG. 7 depicts a servo control architecture including first, second, and third cascaded control loops.

FIG. 7 depicts one example of a servo control architecture 200 including first, second, and third cascaded control loops, a slowest outer position loop 202, a middle velocity loop 204, and an inner current control loop 206 taking its set point current demand from the velocity loop 204 and using FOC to work in the dq reference frame. It will be understood that the depicted architecture is merely an example and that the artisan of ordinary skill will be readily able to implement other proportional integral (PI) controller configurations.

A demand angular position $\theta_r$ and an absolute angular position $\theta$ are summed in outer loop 202 at 212. The plant for the outer position loop 202 may be taken as a pure integrator (as indicated at 224) given the assumption that the velocity loop is sufficiently fast. Therefore a nested PI-SISO architecture may be used for the position loop with pole placement gains given by $\omega_n^2$ and $2\delta\omega_n$ for the forward path integral and the feedback path proportional gains respectively.

The position error from 212 is received at 214 and processed to obtain a position control output (e.g., a velocity demand). The position control output is combined at 216 with a measured rotation rate of the tool collar obtained at 208 and a relative demand velocity $\dot{\theta}$ of the common stator (e.g., the control housing) with respect to the tool collar obtained in middle loop 204 to compute a velocity error. The velocity error is received at 218 and processed to compute a demand torque which is processed in inner loop 206 as described below.

The middle velocity loop 204 may be proportional only and may be configured using pole placement assuming a first order lag open loop plant. This first order lag assumption tends to be reasonable given that the dominant dynamics are inertia and a friction dominated second order transfer function, the derivative of which is a first order lag. Thus, the pole placement proportional gain may be given by $$\dfrac{J_s - C_s \tau_1}{\tau}$$

where $\tau_1$ represents the control specification for the velocity response time constant.

It will be understood that the inner current control loop 206 is not fully depicted, but rather its location in the control architecture 200 is indicated by 206. A demand torque is received from 218 and divided by a motor constant to obtain the demand quadrature current $I_{q2}^r$ which is turn processed to obtain the three phase sinusoidal currents as described above with respect to FIG. 3. These currents are then fed back though inverse Clarke-Park transforms (to obtain a corresponding quadrature current) and summed with the demand quadrature current to complete the loop 206. The use of FOC causes the open loop plant for the inner current control loop to be of the form $$\dfrac{1/L}{s + R/L}.$$

Thus, a nested PI-SISO architecture is used with pole placement gains given by $L\omega_n^2$ and $2L\delta\omega_n - R$ for the forward path integral in the feedback Path proportional gains, respectively. The closed loop control specifications are the natural frequency $\omega_n$ and the damping ratio $\delta$.

In the disclosed embodiments element 220 may include the SVM inverter 124 depicted on FIG. 3 and the actual physical plant being controlled (the tool hardware). It receives the demand quadrature current input and outputs the rotational velocity of the control housing. The rotational velocity of the housing may then be summed at 222 with a tool collar velocity 208 and then integrated at 224 to obtain the absolute angular position $\theta$.

Simulation Results

A transient simulation of the above described control system was created in Matlab/Simulink using the parameter values listed below in Table 1. The simulation included the non-linear open loop plant (described above with respect to Equations 1-4) and the voltage regulating and servo FOC controllers 110 and 120 described above with respect to FIGS. 3-6. The electromagnetic portion of the open loop plant was expressed in the dq reference frame and coupled to the rotational mechanical dynamics as per the governing equations given by Equation 4.

TABLE 1 transient simulation parameters

| Parameter | Description | Value |
|---|---|---|
| $L_q$, $L_d$ | Torquer dq phase inductance | 1.0 mH |
| $R_s$ | Torquer dq phase stator resistance | 9 Ω |
| C | Voltage regulator shunt capacitor | 3.6 mF |
| $\varphi_m$ | Torquer flux linkage | $2.0 \times 10^{-2}$ Vs/rad |
| P | Number of torquer pole pairs | 6 |
| $J_s$ | Stator and inertia (inner part) | $6.75 \times 10^{-3}$ kgm$^2$ |
| $J_r$ | Impeller/rotor inertia (outer part) | $2.18 \times 10^{-3}$ kgm$^2$ |
| $R_L$ | Load resistance | 100 Ω |
| $C_s$ | Assumed stator to collar friction coefficient | 0.7 Nms/rad |
| $T_{m1}$, $T_{m2}$ | Torquer impeller disturbance torques | 200, −200 Nm |

The control specifications for the voltage regulating and servo control loops are shown in Table 2.

TABLE 2 pole placement control specifications

| Symbol | Loop - Description | Value |
|---|---|---|
| δ | All loops - closed loop damping ratio | 0.707 |
| $\omega_{n1}$ | Position loop - natural frequency | 1.257 rad/s |
| $\tau_1$ | Velocity loop - time constant | 1 msec |
| $\omega_{n2}$ | Current loop - natural frequency | 25.13 rad/sec |
| $\omega_{n3}$ | Voltage loop - first natural frequency | 100 rad/sec |
| $\omega_{n4}$ | Voltage loop - second natural frequency | 50 rad/sec |
| $\tau_2$ | Voltage loop - pole time constant | 0.2 sec |

FIGS. 8-12 depict plots of various simulation parameters versus time. In each plot the time scale is from 0 to 150 seconds. The simulation parameters demonstrate the effect the stator toolface angle $\theta_s$ being stepped from 0 to 90 degrees at time zero seconds and from 90 to 180 degrees at time 50 seconds and the load resistance $R_L$ being doubled from 100 to 200Ω at 125 seconds.

Figure 8:
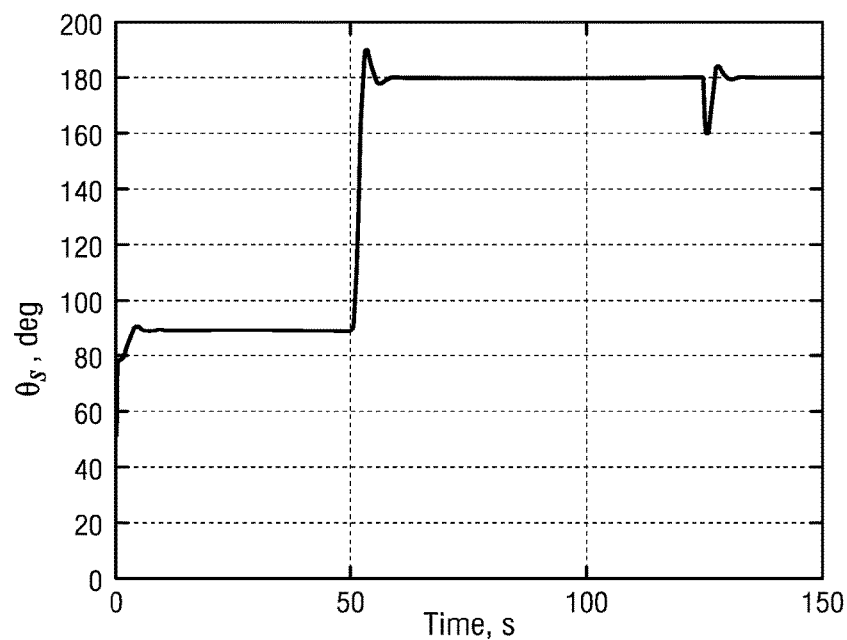
FIG. 8 depicts a plot of the stator toolface angle $\theta_s$ versus time for a numerical simulation.

FIG. 8 depicts a plot of the stator toolface angle $\theta_s$ versus time and thus shows the geostationary rotational position response of the servo controlled stator (roll stabilized housing). As depicted, the stator toolface angle tracks the demand positions of 90 degrees and the step change to 180 degrees with zero steady-state error and fast response times having small overshoots. The step change in load resistance at 125 seconds resulted in a small disturbance in which the toolface angle dropped to about 160 degrees and was then quickly recovered with a slight overshoot.

Figure 9A:
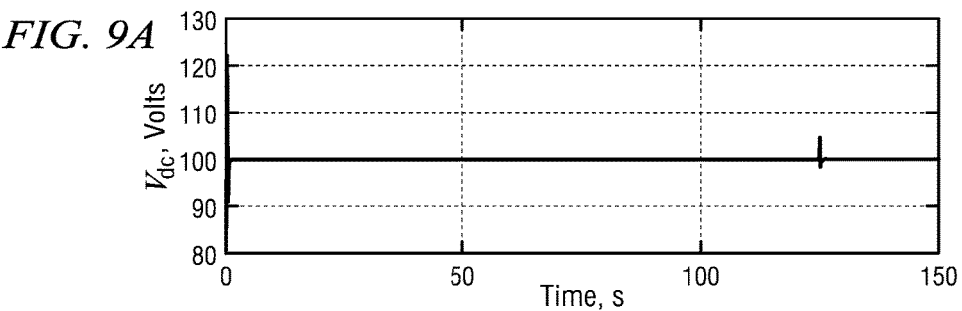
FIGS. 9A and 9B (collectively FIG. 9) depict plots of the regulated voltage $V_{DC}$ (9A) and a corresponding load current $I_L$ (9B) versus time for the numerical simulation.
Figure 9B:
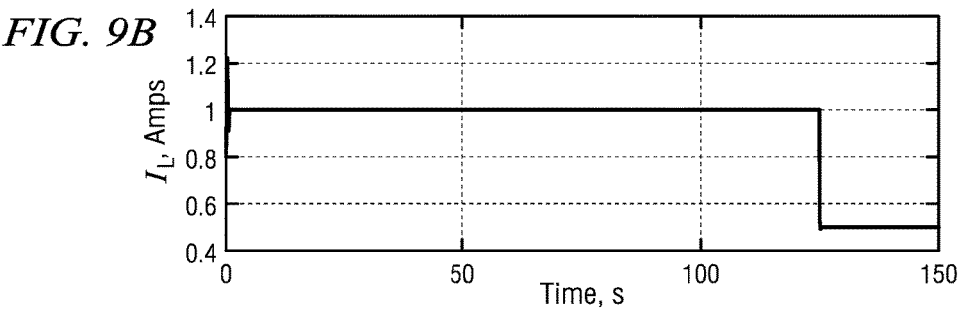

FIGS. 9A and 9B depict plots of the regulated voltage $V_{DC}$ (9A) and a corresponding load current $I_L$ (9B) versus time. Note that the regulated voltage remained steady at 100 volts with a minor 5 V disturbance at 125 seconds. The corresponding load current dropped from 1.0 to 0.5 Amp at 125 seconds due to the increased load resistance.

Figure 10A:
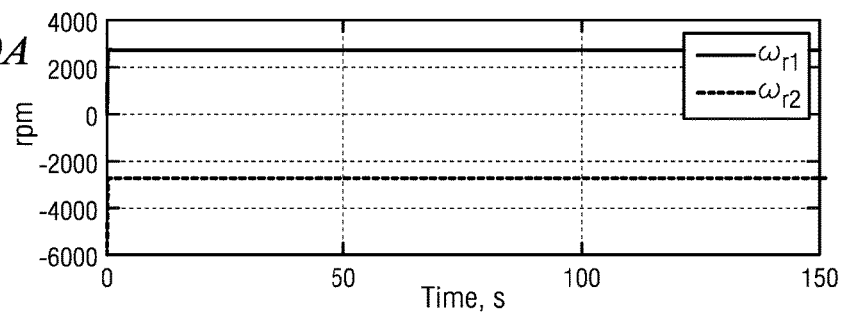
FIGS. 10A and 10B (collectively FIG. 10) depict plots of the rotation speeds of the rotors in the first and second torquers $\omega_{r1}$ and $\omega_{r2}$ (10A) and the rotation speed of the stator $\omega_s$ (10B) versus time for the simulation.
Figure 10B:
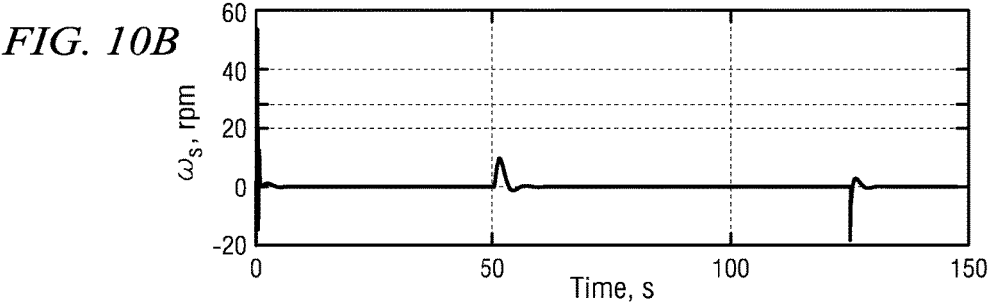

FIGS. 10A and 10B depict plots of the rotation speeds of the rotors in the first and second torquers $\omega_{r1}$ and $\omega_{r2}$ (10A) and the rotation speed of the stator $\omega_s$ (10B) versus time. Note that the rotor rotation speeds remain constant over the time interval. Note also that the rotors rotate in opposite directions. The stator rotation rate was zero except for minor disturbances at 50 and 125 seconds.

Figure 11A:
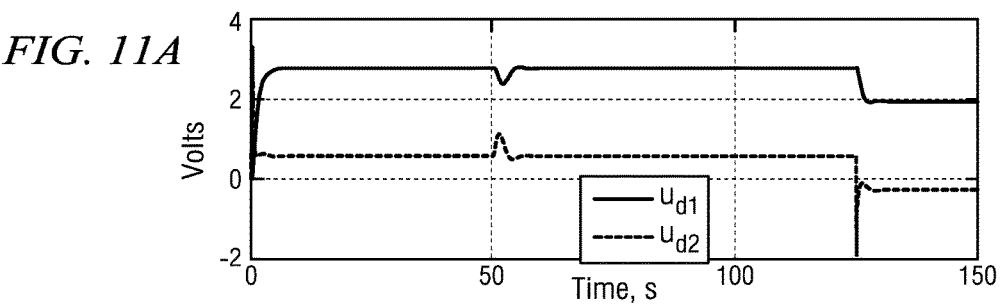
FIGS. 11A and 11B (collectively FIG. 11) depict plots of the FOC control outputs $u_{d1}$ and $u_{d2}$ (11A) and $u_{q1}$ and $u_{q2}$ (11B) in units of volts versus time for the simulation.
Figure 11B:
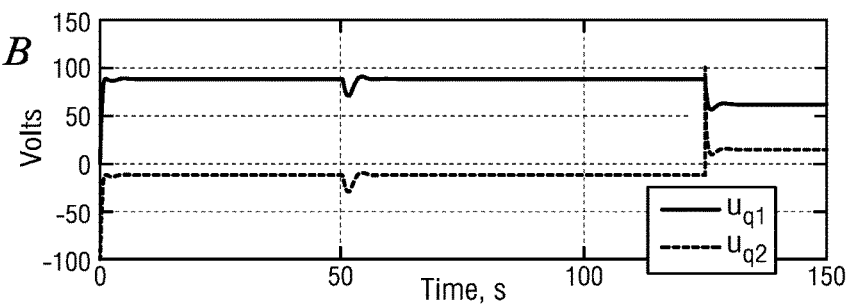
Figure 12A:
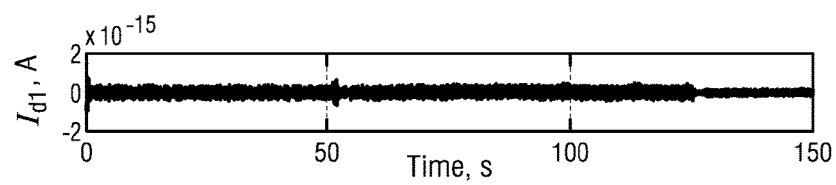
FIGS. 12A, 12B, 12C, and 12D (collectively FIG. 12) depict plots of the current responses for the voltage regulating $I_{d1}$ and $I_{q1}$ (12A and 12B) and servo control $I_{d1}$ and $I_{q1}$ (12C and 12D) loops versus time for the simulation.
Figure 12B:
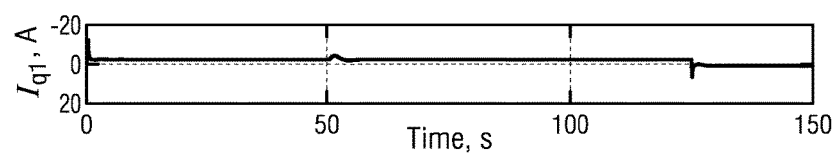
Figure 12C:
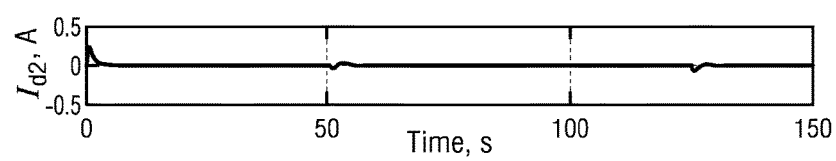
Figure 12D:
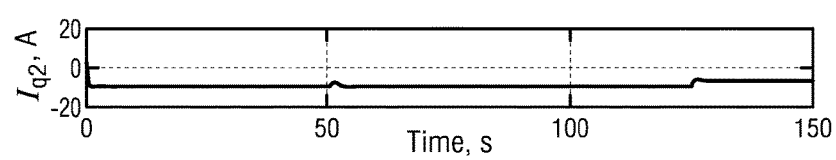

FIGS. 11A and 11B depict plots of the FOC control outputs $u_{d1}$ and $u_{d2}$ (11A) and $u_{q1}$ and $u_{q2}$ (11B) in units of volts versus time. The control outputs remained substantially constant (steady) from about 0 to about 125 seconds with the exception of a minor disturbance at 50 seconds due to the step-function change in the demanded stator toolface. At 125 seconds a step-function change in the control outputs was observed due to the change in load resistance.

FIGS. 12A, 12B, 12C, and 12D depict plots of the current responses for the voltage regulating $I_{d1}$ and $I_{q1}$ (12A and 12B) and servo control $I_{d1}$ and $I_{q1}$ (12C and 12D) loops versus time. For both control loops the current responses were as expected with the direct phase currents being regulated to near zero in the quadrature phase currents being proportional to the voltage and torque control effort.

The methods described herein may be configured for downhole implementation via various hardware controllers (e.g., deployed in the roll stabilized housing 70 depicted on FIG. 2). A suitable controller may include, for example, a programmable processor, such as a microprocessor or a microcontroller and processor-readable or computer-readable program code embodying logic. A suitable processor may be utilized, for example, to execute the methodology depicted in FIGS. 3-7 (or various steps in these methodologies). A suitable controller may also optionally include other controllable components, such as sensors (e.g., a depth sensor), data storage devices, power supplies, timers, and the like. The controller may also be disposed to be in electronic communication with various sensors (e.g., accelerometer or magnetometer based tool face sensors, voltage sensors, and sensors configured to measure the relative positional and rotational speeds between the torquer rotors and stator). Suitable controllers may also optionally communicate with other instruments in the drill string, such as, for example, telemetry systems that communicate with the surface. Suitable controllers may further optionally include volatile or non-volatile memory or a data storage device.

Although a system and method for providing roll stabilized control in a rotary steerable tool has been described in detail, it should be understood that various changes, substitutions and alternations can be made herein without departing from the spirit and scope of the disclosure as defined by the appended claims.

What is claimed is:

1. A downhole tool comprising:
    a downhole tool collar configured for coupling with a drill string such that the tool collar rotates with the drill string;
    a roll stabilized housing deployed in and rotationally decoupled from the tool collar;
    first and second turbine alternators deployed in the tool collar, the first and second turbine alternators including corresponding first and second stators that are rotationally coupled to one another and to the roll stabilized housing, the first and second turbine alternators further including corresponding first and second rotors configured to rotate freely with respect to one another and with respect to the tool collar and the roll stabilized housing; and
    an electronic controller deployed in the roll stabilized housing, the electronic controller including first and second field oriented controllers, the first field oriented controller configured to cause the first turbine alternator to provide a constant DC voltage to a voltage bus, the second field oriented controller configured to receive power from the voltage bus and to cause the second turbine alternator to provide servo angular position control for the roll stabilized housing,
    wherein the controller is configured to (i) cause a servo regulator to process a demand angular position and a measured angular position of the roll stabilized housing to output direct and quadrature demand currents to the second field oriented controller and (ii) cause the second field oriented controller to transform the direct and quadrature demand currents to first, second, and third three-phase sinusoidal currents to regulate power output from the second turbine alternator to provide the servo angular position control for the roll stabilized housing.

2. The downhole tool of claim 1, wherein the first turbine alternator is deployed on a first axial end of the roll stabilized housing and the second turbine alternator is deployed on a second opposing axial end of the roll stabilized housing.

3. The downhole tool of claim 1, wherein the first and second turbine alternators are electrically connected to one another through the voltage bus and mechanically connected to one another through the roll stabilized housing.

4. The downhole tool of claim 1, further comprising:
first and second position sensors configured to measure a rotational position of the first and second rotors with respect to the roll stabilized housing.

5. The downhole tool of claim 1, wherein the second field oriented controller is configured to hold the roll stabilized housing in a substantially geostationary rotational position while the tool collar rotates in a wellbore.

6. The downhole tool of claim 1, being a rotary steerable tool.

7. The downhole tool of claim 1, wherein:
wherein the controller is further configured to (iii) cause a voltage regulator to process a demand voltage and a measured voltage at the voltage bus to output direct and quadrature demand currents to the first field oriented controller and (iv) cause the first field oriented controller to transform the direct and quadrature demand currents to first, second, and third three-phase sinusoidal currents to regulate the power output from the first turbine alternator to provide the constant DC voltage at the voltage bus.

8. A method for controlling a downhole tool, the method comprising:
(a) pumping drilling fluid through the downhole tool while rotating the downhole tool in a subterranean wellbore, the downhole tool including first and second turbine alternators electrically connected to one another via a voltage bus and mechanically connected to one another via corresponding rotationally coupled components;
(b) causing a voltage regulator to process a demand voltage and a measured voltage at the voltage bus to output direct and quadrature demand currents to a first field oriented controller;
(c) causing the first field oriented controller to transform the direct and quadrature demand currents to first, second, and third three-phase sinusoidal currents, the three-phase sinusoidal currents operative to regulate power output from the first turbine alternator to provide a constant DC voltage at the voltage bus; and
(d) causing a second field oriented controller to receive electrical power from the voltage bus and to regulate the second turbine alternator to provide servo angular position control of the rotationally coupled components.

9. The method of claim 8, wherein (c) further comprises:
(i) transforming the direct and quadrature demand currents to direct and quadrature voltages; and
(ii) transforming the direct and quadrature voltages to the first, second, and third three-phase sinusoidal currents.

10. The method of claim 8, wherein (d) further comprises:
(i) causing a servo regulator to process a demand angular position and a measured angular position of the rotationally coupled components to output direct and quadrature demand currents to the second field oriented controller; and
(ii) causing the second field oriented controller to transform the direct and quadrature demand currents to first, second, and third three-phase sinusoidal currents, the three-phase sinusoidal currents operative to regulate power output from the second turbine alternator to provide the servo control of the rotationally coupled components.

11. The method of claim 10, wherein (ii) further comprises:
(iia) transforming the direct and quadrature demand currents to direct and quadrature voltages; and
(iiib) transforming the direct and quadrature voltages to the first, second, and third three-phase sinusoidal currents.

12. The method of claim 8, wherein (d) comprises causing the second field oriented controller to receive electrical power from the voltage bus and to regulate the second turbine alternator to maintain the rotationally coupled components in a substantially geostationary rotational position with respect to the wellbore.

13. A method for controlling a downhole tool, the method comprising:
(a) pumping drilling fluid through the downhole tool while rotating the downhole tool in a subterranean wellbore, the downhole tool including first and second turbine alternators electrically connected to one another via a voltage bus and mechanically connected to one another via corresponding rotationally coupled components;
(b) causing a first field oriented controller to regulate power output from the first turbine alternator to provide a constant DC voltage at the voltage bus; and
(c) causing a second field oriented controller to receive electrical power from the voltage bus and to regulate the second turbine alternator to provide servo angular position control of the rotationally coupled components; and
(d) measuring (i) a relative rotational position between a first rotationally decoupled component in the first turbine alternator and the rotationally coupled components and (ii) a relative rotational position between a second rotationally decoupled component in the second turbine alternator and the rotationally coupled components.

14. The method of claim 13, wherein (b) further comprises:
causing a voltage regulator to process a demand voltage and a measured voltage at the voltage bus to output direct and quadrature demand currents to the first field oriented controller;
(ii) causing the first field oriented controller to process the relative rotational position between the first rotationally decoupled component and the rotationally coupled components measured in (d) to transform the direct and quadrature demand currents to direct and quadrature voltages; and
(iii) causing the first field oriented controller to transform the direct and quadrature voltages to first, second, and third three-phase sinusoidal currents, the three-phase sinusoidal currents operative to regulate the power output from the first turbine alternator to provide the constant DC voltage at the voltage bus.

15. The method of claim 13, wherein (c) further comprises:
(i) causing a servo regulator to process a demand angular position and a measured angular position of the rotationally coupled components to output direct and quadrature demand currents to the second field oriented controller;
(ii) causing the second field oriented controller to process the relative rotational position between the second rotationally decoupled component the rotationally coupled components measured in (d) to transform the direct and quadrature demand currents to direct and quadrature voltages; and
(iii) causing the second field oriented controller to transform the direct and quadrature voltages to first, second, and third three-phase sinusoidal currents, the three-phase sinusoidal currents operative to regulate the power output from the second turbine alternator to provide the servo control of the rotationally coupled components.

16. A method for controlling a downhole tool, the method comprising:
(a) pumping drilling fluid through the downhole tool while rotating the downhole tool in a subterranean wellbore, the downhole tool including first and second turbine alternators electrically connected to one another via a voltage bus and mechanically connected to one another via corresponding rotationally coupled components;
(b) causing a first field oriented controller to regulate power output from the first turbine alternator to provide a constant DC voltage at the voltage bus;
(c) causing a servo regulator to process a demand angular position and a measured angular position of the rotationally coupled components to output direct and quadrature demand currents to a second field oriented controller; and
(d) causing the second field oriented controller to transform the direct and quadrature demand currents to first, second, and third three-phase sinusoidal currents, the three-phase sinusoidal currents operative to regulate power output from the second turbine alternator to provide the servo control of the rotationally coupled components.

17. The method of claim 16, wherein (d) further comprises:
(i) transforming the direct and quadrature demand currents to direct and quadrature voltages; and
(ii) transforming the direct and quadrature voltages to the first, second, and third three-phase sinusoidal currents.

18. The method of claim 16, wherein (d) comprises causing the second field oriented controller to receive electrical power from the voltage bus and to regulate the second turbine alternator to maintain the rotationally coupled components in a substantially geostationary rotational position with respect to the wellbore.

* * * * *